United States Patent
Stephens

(10) Patent No.: US 8,902,829 B2
(45) Date of Patent: Dec. 2, 2014

(54) METHOD AND DEVICE TO IMPROVE CHANNEL COEXISTENCE USING NON-CONTIGUOUS CHANNELS OF A WIRELESS NETWORK

(75) Inventor: Adrian Stephens, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 781 days.

(21) Appl. No.: 12/959,739

(22) Filed: Dec. 3, 2010

(65) Prior Publication Data

US 2012/0140646 A1 Jun. 7, 2012

(51) Int. Cl.
*H04W 4/00* (2009.01)
*H04W 16/14* (2009.01)

(52) U.S. Cl.
CPC .................................. *H04W 16/14* (2013.01)
USPC ............................ 370/329; 370/252; 370/466

(58) Field of Classification Search
USPC ......... 370/229, 230, 235, 236, 252, 310, 322, 370/328, 329, 332, 333, 341, 348, 431, 436, 370/437, 466
See application file for complete search history.

(56) References Cited

U.S. PATENT DOCUMENTS

| | | | | |
|---|---|---|---|---|
| 8,331,418 | B2 * | 12/2012 | Chou ............................. | 375/135 |
| 2004/0162115 | A1 * | 8/2004 | Smith et al. ................ | 455/562.1 |
| 2007/0264935 | A1 * | 11/2007 | Mohebbi ...................... | 455/41.2 |
| 2009/0052382 | A1 * | 2/2009 | Stephenson et al. .......... | 370/329 |
| 2009/0252127 | A1 * | 10/2009 | Rangarajan et al. .......... | 370/338 |
| 2009/0258597 | A1 * | 10/2009 | Chen et al. ................... | 455/41.2 |
| 2010/0022264 | A1 | 1/2010 | Kwon et al. | |
| 2010/0208681 | A1 | 8/2010 | Elmaleh | |
| 2010/0240311 | A1 * | 9/2010 | Zhang et al. ..................... | 455/62 |
| 2010/0246554 | A1 * | 9/2010 | Alapuranen et al. .......... | 370/343 |
| 2010/0302966 | A1 * | 12/2010 | Matsuura ....................... | 370/252 |
| 2010/0302969 | A1 * | 12/2010 | Duenyas et al. .............. | 370/252 |
| 2011/0096739 | A1 * | 4/2011 | Heidari et al. ................ | 370/329 |
| 2011/0280335 | A1 * | 11/2011 | Tu et al. ........................ | 375/295 |
| 2011/0281534 | A1 * | 11/2011 | Liao et al. .................. | 455/127.1 |
| 2011/0292919 | A1 * | 12/2011 | Trainin et al. ................. | 370/338 |
| 2012/0069804 | A1 * | 3/2012 | Kim et al. ..................... | 370/329 |
| 2012/0113952 | A1 * | 5/2012 | Kneckt et al. ................. | 370/330 |

FOREIGN PATENT DOCUMENTS

| | | |
|---|---|---|
| WO | 2012/074714 A2 | 6/2012 |
| WO | 2012/074714 A3 | 8/2012 |

OTHER PUBLICATIONS

International Search Report and Written Opinion received for PCT Patent Application No. PCT/US2011/060267, mailed on Jun. 15, 2012, 9 pages.
"International Application Serial No. PCT/US2011/060267, International Preliminary Report on Patentability mailed Jun. 4, 2013", 6 pgs.
"International Application Serial No. PCT/US2011/060267, Written Opinion mailed Jun. 15, 2012", 4 pgs.

* cited by examiner

*Primary Examiner* — Kwang B Yao
*Assistant Examiner* — Nguyen Ngo
(74) *Attorney, Agent, or Firm* — Schwegman Lundberg & Woessner, P.A.

(57) ABSTRACT

A method and device. The device is to use a first frequency segment of a wireless non-contiguous channel to monitor non-operating channels within an operating range of a wireless network; and use a second frequency segment of the wireless channel as a communication channel of the wireless network.

25 Claims, 3 Drawing Sheets

METHOD AND DEVICE TO IMPROVE CHANNEL COEXISTENCE USING NON-CONTIGUOUS CHANNELS OF A WIRELESS NETWORK

BACKGROUND

The present invention concerns networking in general, and to a method and apparatus to monitor non-operating or free channels in a wireless communication system to determine which of those channels would be available to a wireless network.

Channel management by a wireless access point (AP) is brought about in part by a need to detect legacy systems across multiple channels. An AP, such as, for example, an AP that is part of a 802.11 network (that is, a network that supports an Institute of Electrical and Electronics Engineers (IEEE) 802.11 Standard), may coordinate with one or more stations (MD's) to have the one or more MD's monitor a non-operating channels in a wireless communication system. Typically, the MD disappears from the network for a set period of time after which it transmits a monitoring report to the AP that allows the AP to determine whether alternative channels are available to the network. In the alternative, the AP itself may disappear from the network for the set period of time in order to fulfill such monitoring function. However, the current monitoring schemes disadvantageously eradicate wireless operation during the monitoring time periods, in this way compromising network performance and increasing the possibility of dropped connections.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
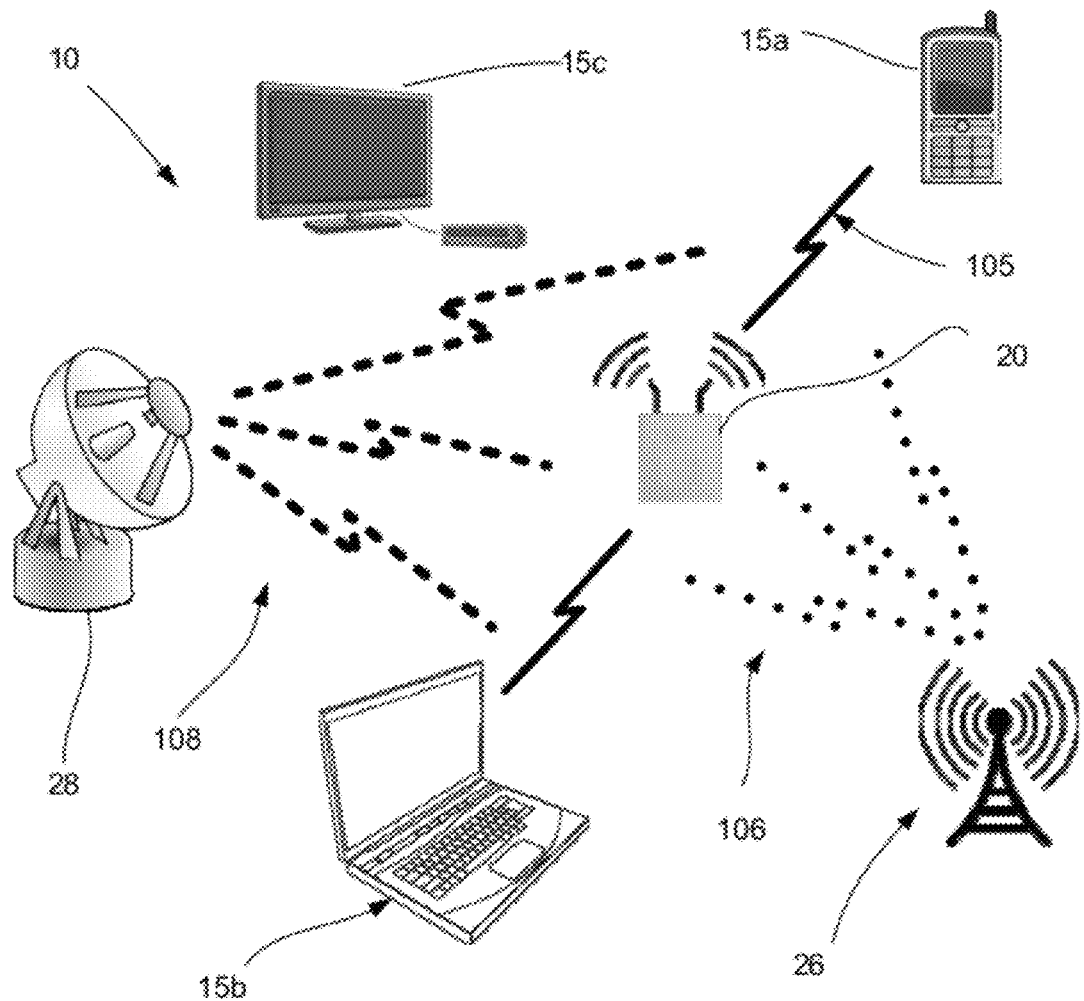
FIG. 1 shows a WLAN configuration in which embodiments may be implemented.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. Thus, although certain functions may be described below with reference to a "component," it is understood that embodiments are not so limited, and are intended to encompass within their scope an implementation of those functions using one or any combination of hardware, firmware and software as noted above. The invention may also be implemented as instructions contained in or on a computer-readable medium, which may be read and executed by one or more processors to enable performance of the operations described herein. A computer-readable medium may include any mechanism for storing information in a form readable by one or more computers. For example, a computer-readable medium may include a tangible storage medium, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

As used within this document, the term "network controller" is intended to cover devices that schedule and control, at least partially, wireless communications by devices in the network. A network controller may also be known as a base station (BS), access point (AP), central point (CP), or any other term that may arise to describe the functionality of a network controller.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

Some embodiments encompass the use of a Wireless Local Area Network (WLAN) device that supports an Institute of Electrical and Electronics Engineers (IEEE) 802.11 Standard (e.g. IEEE Std 802.11n-2007, 802.11a, 802.11e, etc), although other IEEE standards may also be within the purview of embodiments. Such a device includes two main parts: 1) a physical (PHY) layer signaling control device; and 2) a medium access control (MAC) device. The function of the PHY device is to transfer data packets over the air interface. Among other things, the function of the MAC device is to control access to the shared air interface. When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11 Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work is ongoing on a new standard, IEEE 802.11ac, that promises to provide even greater throughput.

A WLAN configuration 10 in which embodiments may be implemented is shown in FIG. 1. WLAN 10 includes a mobile station 15a, a laptop computer station 15b, an Internet TV station 15c, each of which is enabled to communicate with the other MD's in the WLAN via a wireless access point (AP) 20. In many installations, a wireless AP will also provide a higher-speed network interface for connection to a conventional wired network, such as an Ethernet interface (not shown), to enable computers on a WLAN to also access a conventional wired LAN or WAN (wide area network). An AP provides a basic and extended service set to one or more MD's that communicate with it, thus facilitating and coordinating communication and channel access between MD's and serving as a relay station for data traffic between those MD's.

As further shown in FIG. 1, suppose that, at the time that one of the MD's, such as MD 15a, begins a transmission to another MD, such as MD 15b, as depicted by transmission signal 105 through AP 20, a legacy BS, such as from a base station (BS) 26, starts transmissions in range of MD's 15a and 15b, depicted by transmission signal 106 for example. Transmission signal 106 of the legacy BSS tends to create harmful interference with transmission signal 105 from MD 15a to MD 15b, taking up channels that would have been available to WLAN 10. Under such circumstances, it is necessary to be able to monitor channel use within the transmission range of WLAN 10 in order to be able to select available channels. In addition, suppose that, at the same time as transmission signal 105 is started from MD 15a to 15b, a radar transmission in the form of signal 108 are also being sent from radar 28. According to Dynamic Frequency Selection (DFS) requirements, which mandate radar avoidance now in the 5 GHx range, channels in the transmission range of a WLAN would need to be monitored for radar transmissions for a preset amount of time, or check time, and, should radar be detected in a given channel, that channel must be cleared and stay non-occupied within a set period of time. As part of the detection criteria for DFS, additional operating parameters are to be met, such as a one minute check time to determine whether radar signals are present within a channel, a maximum channel clear time of 10 seconds before a device must clear the channel. DFS check times have a minimum duration of one minute. As previously noted, current systems allocate either a MD or the AP itself to the monitoring tasks referred to above, in this way eradicating transmission during the monitoring time, which causes delays and transmission cut-off.

Some WLAN technologies may use non-contiguous frequency segments for communication, such as two separated 80 MHz segments to form one logical 160 MHz operating channel. Devices within this network may or may not support this operation—i.e., some devices may support only 80 MHz operation while others support 160 MHz operation. The network can function with a mixture of 80 MHz and 160 MHz devices, and can provide a means for a 160 MHz-capable device (which could be an MD or the AP) to temporarily declare itself capable of only 80 MHz operation while still maintaining operation within the network.

In particular, WLAN systems, such as for example 802.11 160 MHz systems (that is, systems that support an Institute of Electrical and Electronics Engineers (IEEE) 802.11 Standard), may in some instances come in two types: systems including non-contiguous channels, and those including contiguous channels. Non-contiguous channels among others allow flexibility in responding to the configuration of interfering/competing networks and radars to be avoided, essentially by improving the probability that a device may find a workable 80 MHz+80 MHz non-contiguous channel versus a 160 MHz contiguous channel. For example, according to an 802.11 160 MHz network, a non-contiguous 160 MHz PHY transmission may be established whose frequency spectrum consists of a first segment transmitted using one 80 MHz channel, and a second segment transmitted using another 80 MHz channel, possibly non-adjacent in frequency. Thus, 160 MHz non-contiguous devices according to some embodiments could operate with 160 MHz contiguous or non-contiguous networks. In general, non-contiguous channels may share the same antenna. Embodiments encompass using one of the frequency segments to perform the monitoring of non-operating channels within the transmission range of the WLAN while the other one of the frequency segments operates to transmit communication signals as part of the WLAN. In this way, monitoring may take place without eradicating transmission in order for monitoring to take place, thus resulting in minimal impact on current operation of the WLAN.

Advantageously, embodiments allow the repurposing of existing hardware in a WLAN, such as an 802.11 WLAN, to allow one segment of a non-contiguous channel to monitor and the other segment to engage in signal transmission. Repurposing as noted above entails much lower costs and complexity than providing a new receive chain from scratch, thus allowing an implementation of embodiments both efficiently and effectively.

Embodiments envisage the use of a frequency segment of a given non-contiguous channel for monitoring while another frequency segment of the channel is used as an operating channel within a WLAN. According to an embodiment, a network controller, such as, for example, an AP, could fulfill this function. In this way, although bandwidth may be compromised and communication degraded as a result, communication is not eradicated as in the case of the prior art. A partial and managed degradation in communication is preferable to sudden collapse of the network (for example as in the prior art where, if a radar is detected, DFS rules would require the AP to find an alternative channel, which would require collapse of the network during the transition from one channel to the next).

Embodiments thus advantageously provide a mechanism that enables a wireless device, such as a 802.11 device (that is, a device that supports an Institute of Electrical and Electronics Engineers (IEEE) 802.11 Standard), including for example a network controller, to operate on a non-contiguous channel of a WLAN and to at the same time re-purpose a segment of its non-contiguous channel to monitor non-operating channels, and further to switch its operation to one of the monitored channel segments where desirable, thus avoiding loss of service for a period of time during which monitoring and/or channel transition takes place. By "non-operating channel" what is meant in the context of embodiments is a channel that is not operating to carry signals of the WLAN on behalf of which monitoring is to take place.

Advantageously, embodiments may be used to differentiate a quality of service provided by an AP and potentially improve the value proposition of wireless products, such as some 802.11 devices involving the use of non-contiguous channels. Embodiments may be particularly suited to high volume architecture wireless devices.

Figure 2:
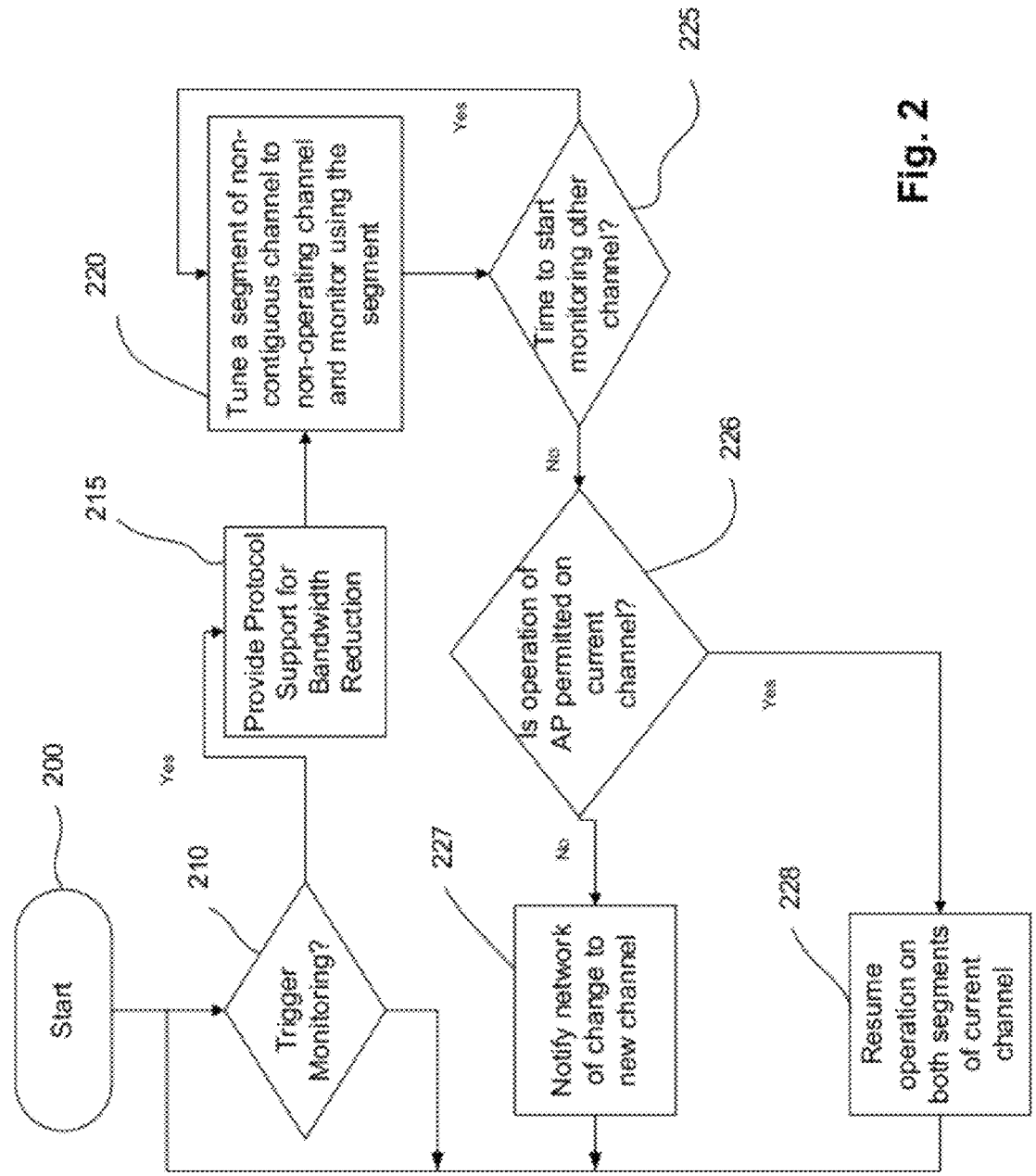
FIG. 2 shows a flowchart of logic used by a master device in order to monitor and select an available channel according to one embodiment.

Referring next to FIG. 2, a flowchart is shown of logic used by a master device in order to monitor and select an available channel according to one embodiment. The process may begin at block 200, in which possible monitoring using a segment of a non-contiguous channel may be started. At block 210, a monitoring event may be triggered. The triggering may be brought about by a number of different factors, such as, for example, an observation of a high amount of packet error rates (PER's) by the network controller, or received beacons by the network controller from competing networks overlapping the home channels (for example, the channels available to WLAN 10 in FIG. 1). A threshold for the PERs and/or beacons beyond which monitoring may be triggered may be implementation dependent. Monitoring could also be triggered during "quiet" periods, for example between packets, or when the AP communicates to its MD that the STA should not communicate for a given period, or during received packets (such as from PHY decoder metrics). Typically, when one or more MD's from a competing network is/are positioned so that its signals are stronger than the receiver sensitivity of the home network, it is easier for the MD's from the home network to share airtime with those competing MD's. This is because the MD's of either network share a common understanding of the reservations of the MD's in the other network through signaling in packets received from the other network. In 802.11, this mechanism is referred to as the NAV (Network Allocation Vector). However, when the competing MD's are positioned such that signal power is weaker than a sensitivity threshold of the receiver, but strong enough to degrade the expected signal-to-noise-ratio (SNR) at the receiver, transmissions from those competing MD's raises the noise floor within the environment of the home network, degrading signal transmission. Embodiments allow a more effective way of monitoring available channels within a home network by allowing a segment of a non-contiguous channel of that home network to do the monitoring, even in the case of hostile networks whose MD's are far away from the MD's of the home network. For example, received power could be monitored on that segment of the non-contiguous channel, although the repurposed hardware could not perhaps perform a full receive function. Thus, some embodiments allow more timely choices to be made regarding when to move to a new channel, and which new channel to move to.

Referring still to FIG. 2, the triggering may also be brought about through in a clocked manner by starting and stopping monitoring within predetermined time periods. For example, monitoring may be triggered for one minute up to several minutes every hour. In the alternative, according to one embodiment, when network load is high, triggering may take place based on the presence of hostile networks, such as through an observation of increased PER's and beacons as explained above. For example, an AP may monitor a given channel and its own network. If the AP determines that the channel is busy 70% of a given time interval, has a large amount of data to communicate, but gets only 20% of that time interval for the AP's network, then the AP can conclude that there are three fully loaded networks attempting to share that channel. The above is one example of a circumstance when network load would be considered high. However, when network load is low, such as for example when a channel's busy time is less than 30% of a given time interval, the triggering may take place at predetermined time intervals. According to this last embodiment, the throughput of the network would be minimally affected, given that, in this way, a more efficient use would be made of the segment of the non-contiguous channel that is to be dedicated to monitoring.

One reason why efficient use of the one channel segment of a non-contiguous channel may be an issue is that, where both segments of the non-contiguous channel share an antenna, the monitoring segment may not be able to monitor other channels within the home network during signal transmissions from the shared antenna. A common protocol typically defines the transmit, receive and idle time periods. For example, according to a given protocol, such as, for example, an 802.11 protocol (that is, a protocol according to an Institute of Electrical and Electronics Engineers (IEEE) 802.11 Standard), an antenna may receive transmission signals 10% of the time, transmit signals, such as for instance acknowledgement signals, 1% of the time, and remain idle 89% of the time. In such a case, monitoring of channels within the home network may take place within a dedicated segment of a non-contiguous channel for 99% of the time, that is, during those times when transmit signals are not being sent by the antenna. In instances where the 99% of the time is not continuous as mandated by DFS requirements, DFS requirements may be redefined with the support of regulators to encompass fragmented check times that total the required check time over a time period that is longer than the required check time. For example, a DFS observation may be made for a period of one minute fragmented over two minutes.

The triggering mentioned above may be part of the medium access control (MAC) layer, and may for example be part of the firmware of the MAC layer. Referring still to FIG. 2, the process may also include at block 220 providing protocol support for reduction of bandwidth brought about by monitoring. Once monitoring is triggered, the AP may be unable to transmit and/or receive on the monitoring frequency segment. Any conventional mechanism, such as a conventional mechanism under an 802.11 standard, may be useful in informing its network of the disappearance of the monitoring channel segment. Such mechanisms may for example include extensions to the beacon frame, the channel switch frame, the extended channel switch frame the notify channel width frame, or a specific new frame used for this purpose. These extensions , for example, would allow an AP or MD to declare to its peers a change in its operating channel width between 80+80 MHz and 80 MHz. In general however, any known mechanisms to notify a network of channel bandwidth change would be within the purview of embodiments without the need to make any changes to such mechanisms.

Referring still to FIG. 2, the process may continue at block 220 once monitoring is triggered. In block 220, a segment of a non-contiguous channel may be tuned to a non-operating channel available to the network and used to collect data on that channel. As previously mentioned, the above may be implemented by re-using for example one of the two 80 MHz communication segments of a non-contiguous 160 MHz system for the monitoring purpose. Embodiments are not limited to the use of an 80 MHz segment for monitoring, however, and include within their scope segments having other bandwidths, such as, for example, 40 MHz, 60 MHz, etc, and channels having non-contiguous bandwidths other than 160 MHz. A hardware component may be used in order to bring about the monitoring. The hardware component may for example include a radio, and may also include baseband processor that is part of the radio architecture of an AP. The hardware may also be implemented in the digital portion of the MAC layer in its role of management of statistics gathering. The hardware component may provide the ability to independently select monitoring channel frequency and bandwidth, interference monitoring, 802.11 signal monitoring and/or noise level monitoring, and/or channel activity monitoring. For example, an AP can monitor energy level within its analogue filter versus time. The time characteristic of the obtained data may allow the AP to distinguish between a signal on the one hand (thus facilitating signal monitoring) and interference (thus facilitating interference monitoring). For example, where simple hardware is used, monitoring may take place within predetermined time intervals in order to look for the presence of interfering signals. One way of doing this may involve monitoring the power level/energy level as a function of time. During data and acknowledge transmissions, the energy level per time does not vary appreciably. Appreciable variations then during packet transmissions could indicate intrusion by an interfering signal. Another way may involve looking at power level uniformity as a function of frequency, this method requiring more sophisticated hardware, however. For example, energy could be monitored across each 20 MHz band of an 80 MHz segment. Should the energy level be non-uniform for a 20 MHz band, the signal would be unlikely to belong to the network. Thus, if the AP performs some baseband processing, the AP can view the distribution of energy across the monitored channel. Such energy should be relatively uniform (modulo frequency selective channel fading) in 20 MHz segments. Or if the AP includes a full second signal acquisition mechanism, it could perform autocorrelation or cross correlation to detect packet headers. In such a case, a correlating mechanism may used in order to correlate a sample signal to a digital sample stored in memory, and a filter may be used in order to perform the correlation. Thus, some embodiments envisage the postulation of a system where the channel response may be measured and a probabilistic determination may be made with respect to the presence of interference. The degree of complexity of the system would in general be inversely proportional to the degree to which determination of the presence of interference is probabilistic.

Channel activity monitoring could for example include performing guard interval correlation independently per 20 MHz channel of a 80 MHz segment being used for monitoring according to a 802.11 Standard. As mentioned previously, where antennas are shared between two segments of a non-contiguous channel, transmissions on the operating segment may blind the monitoring segment (that is, they may halt monitoring during the time of the transmissions) so that input to the monitoring segment will be disabled during transmissions on the home network. In such a case, for example where an automatic gain control (AGC) is used on the monitoring segment, the AGC may be clamped (disabled) during home transmissions on the operating segment. This is because the AGC would if not clamped take a finite time period in order to recover from the high levels of home transmission on the operating segment to the much lower levels of transmissions associated with background signals. Disabling the AGC would thus do away with the finite time period, allowing more rapid recovery of the system. In addition, clamping the AGC would be advantageous during home transmissions on the operating segment because it would do away with any statistics calculated with respect to the monitoring taking place during the recovery time period of the AGC.

Monitoring at block 220 may also include some advanced monitoring features. These features may also be provided by the hardware component mentioned above, and may include a decoding of transmissions, such as transmissions under a 802.11 Standard, observed on the monitored channel. Advanced monitoring features may include, for example, finding peer networks or devices on a monitored channel (for example, when the monitored channel is operating in a Wi-Fi Direct PAN), more precise determination of wireless location (i.e.: location of one or more MD's) if location information is received in beacons (such as beacons under a 802.11 Standard), intrusion detection and network diagnostics. Intrusion detection is a security measure (as opposed to interference detection which is geared mainly toward improving performance, for example), and would occur for instance in an enterprise environment, where an AP may wish to scan for unexpected networks, such as by collecting data on network identifiers and reporting any such identifiers that were unexpected within the home network. According to one aspect of embodiments, instead of devoting special hardware to the above task, repurposing existing hardware may be used to arrive at the same goal. Network diagnostics could include information about other APs one can detect on the monitored channel, and enables network planners to plan better coverage across a large area.

As further shown in FIG. 2, the process may include at block 225 a determination as to whether it is time to start monitoring another channel within the network. Block 225 may assume that the AP may perform a scanning operation for some predetermined period of time, or it may use other criteria to stop scanning a channel, such as for example a count of beacons received.

Referring still to FIG. 2, the process may also include at blocks 226, 227 and 228, managing collection of data obtained from monitoring and determining whether a new channel should be used. A hardware memory store to record data obtained from monitoring and a software process that determines whether a new channel should be used. Such a control component may for example be adapted to collect data from the hardware component that effects channel monitoring by the monitoring segment, such data including, for example, possible radar detection, observed channel occupancy per 20 MHz channel, observed channel noise, including for example, a histogram of energy versus duration and when monitoring has completed. Based on such data, the control component may determine at block 226 whether operation of an AP is permitted on the current channel, and/or whether operation of the AP would benefit on a new segment of a non-contiguous channel.

Switching according to embodiments may take place in a number of different ways. For example, according to one embodiment, the monitoring segment may look for a more suitable new operating segment, and operation may be switched to that new operating segment, for example, an 80 MHz segment of a 160 MHz non-contiguous channel. The monitoring segment may keep monitoring after the switching above takes place to maximize bandwidth, and switch operation to a second new operating segment, for example in such a way as to switch operation from an 80 MHz operating channel to the full available bandwidth at 160 MHz. The latter switch to a full bandwidth operating mode takes advantage of relaxed time requirements in certain networks to allow switching from a monitoring mode to a full bandwidth operating mode in two stages. According to another embodiment, the switching from monitoring mode (where one segment is monitoring and another segment is an operating segment) to a full bandwidth operating mode (where all segments of a non-contiguous channel serve as operating segments) could take place in one stage instead of in two stages, for example in the case of a WiFi Direct Link where time slicing may be used. Additionally, switching may involve switching may take various forms based on various parameters that may define a channel. Typically, a set of parameters that may be used to identify a channel may include, for example, channel width, the number of segments per channel, and channel segment parameters. The segment parameters may include, for example, segment frequency, transmission power constraints for a segment, and location of the primary bandwidth. Switching according to embodiments may include switching to change any one or more of the above channel and/or segment parameters either in stages or simultaneously. For example, a regulatory class within which a network operates may be switched according to some embodiments. Thus, in the context of the instant description, where a segment of a non-contiguous channel is described as monitoring a non-operating channel, what is meant is that the segment may be monitoring any parameter of the non-operating channel such as the ones noted above, including any segment of the non-operating channel. In addition, where switching is described to a non-operating channel, what is meant is that the switching may occur from one segment to another segment of a non-operating channel, or to an entire bandwidth of the non-operating channel, either in sequence or simultaneously.

In the event of a change in occupied channels, the control component is adapted at block 227 to notify the AP's network of the same using any suitable mechanisms provided by an 802.11 Standard for that purpose. Such as signaling in an "operations" element in the beacon frame, signaling a new channel and/or regulatory class in a channel switch or extended channel switch frame. These mechanisms may be extended in 802.11 beyond those provided in 802.11n for this purpose. In the event that the original channel still offers the best option the control component may at block 228 resume operation on both segments of the original non-contiguous channel.

Figure 3:
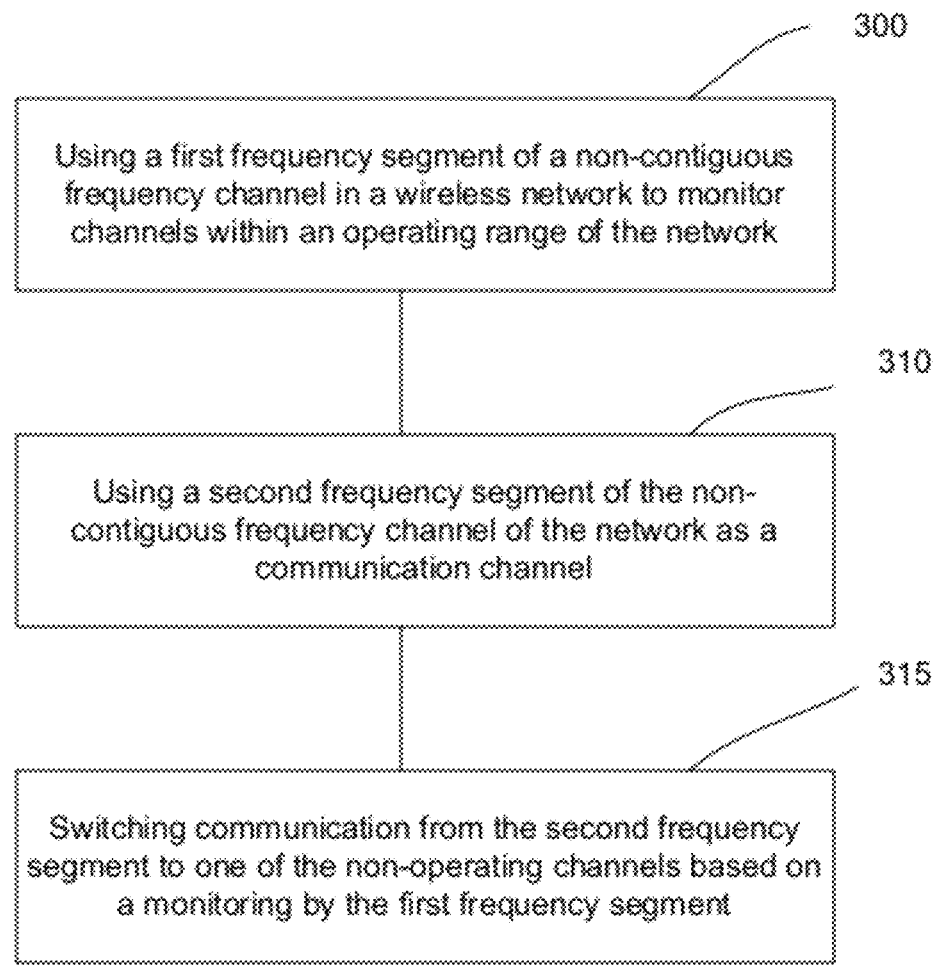
FIG. 3 shows a flowchart depicting a method embodiment.

Referring next to FIG. 3, a flow diagram is provided of a method embodiment. As shown in FIG. 3, a method embodiment may include at block 300, using a first frequency segment of a non-contiguous channel in a wireless network to monitor channels within an operating range of the wireless network, and at block 310, using a second frequency segment of the non-contiguous channel of the wireless network as a communication channel of the wireless network. By "communication channel," what is meant in the context of embodiments is a channel to be used to transmit and receive wireless signals of the wireless network. At block 315, the shown method embodiment may further include switching communication from the second frequency segment to one of the non-operating channels.

According to one embodiment, using the second frequency segment to communicate may include establishing a Wi-Fi Direct link using a non-DFS channel. Thus, by way of example, a MD may initially set up a Wi-Fi Direct link, such as for example an 80 MHz Wi-Fi Direct link, using a non-DFS channel to guarantee quick access to a communication channel (that is, access that is not subject to the relatively long check times typically required for DFS compliance). While the non-DFS is operating, another repurposed segment of a non-contiguous channel, such as for example another 80 MHz repurposed segment of a non-contiguous channel, may be used to monitor channels available to the network to find one or more suitable segments in channels subject to DFS rules. If and when monitoring data shows the DFS segment as being available for communication, the MD may then move its Wi-Fi Direct link to that available DFS segment. The operating channel widths of the home AP and home network may be the same or different. One could for example use the extra segment to monitor two adjacent or non-adjacent 80 MHz channels in sequence, and then create a 160 MHz contiguous or non-contiguous home network.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
 receiving, by a wireless communication device, an allocation of a channel for communication in a wireless network having a bandwidth comprising a first frequency segment and a second frequency segment;
 re-purposing the first frequency segment for monitoring non-operating channels within an operating range of the wireless communication device while continuing to use the second frequency segment for communications by the wireless communication device; and
 switching communication from the second frequency segment to one of the non-operating channels based on a monitoring of the non-operating channels using the first frequency segment, wherein,
 continuing to use the second frequency segment for communications by the wireless communication device comprises establishing a Wi-Fi Direct link using a non-DFS (Dynamic Frequency Selection) channel;
 re-purposing the first frequency segment for monitoring non-operating channels within an operating range of the wireless communication device comprises monitoring non-operating channels subject to DFS rules; and
 switching communication from the second frequency segment to one of the non-operating channels comprises switching communication from the non-DFS channel to one of the channels subject to DFS rules.

2. The method of claim 1, wherein monitoring non-operating channels within an operating range of the wireless communication device comprises performing at least one operation selected from a group consisting of detecting and monitoring radar, monitoring interference, monitoring noise level, monitoring 802.11 signals, and monitoring channel activity.

3. The method of claim 1, further comprising using the first frequency segment to monitor non-operating channels within an operating range of the wireless communication device after switching.

4. The method of claim 1, further comprising triggering monitoring using the first frequency segment based on an observation of at least one attribute selected from a group consisting of packet error rates and received beacons above respective predetermined thresholds.

5. The method of claim 4, further comprising informing the wireless network of a change in communication bandwidth resulting from the triggering.

6. The method of claim 1, further comprising triggering monitoring at predetermined time intervals.

7. The method of claim 1, further comprising informing the wireless network of the switching.

8. The method of claim 1, wherein the first frequency segment and the second frequency segment correspond to non-contiguous 80 MHz segments of a non-contiguous 160 MHz channel.

9. A non-transitory computer readable medium encoded with computer executable instructions which, when accessed, cause a machine to perform operations comprising:
 receiving, by a wireless communication device, an allocation of a channel for communication in a wireless network having a bandwidth comprising a first frequency segment and a second frequency segment;

re-purposing the first frequency segment for monitoring non-operating channels within an operating range of the wireless communication device while continuing to use the second frequency segment for communications by the wireless communication device; and switching communication from the second frequency segment to one of the non-operating channels based on a monitoring of the non-operating channels using the first frequency segment, wherein continuing to use the second frequency segment for communications by the wireless communication device comprises establishing a Wi-Fi Direct link using a non-DFS (Dynamic Frequency Selection) channel:

re-purposing the first frequency segment for monitoring non-operating channels within an operating range of the wireless communication device comprises monitoring non-operating channels subject to DFS rules; and switching communication from the second frequency segment to one of the non-operating channels comprises switching communication from the non-DFS channel to one of the channels subject to DFS rules.

10. The computer readable medium of claim 9, wherein monitoring non-operating channels within an operating range of the wireless communication device comprises performing at least one operation selected from a group consisting of detecting and monitoring radar, monitoring interference, monitoring noise level, monitoring 802.11 signals, and monitoring channel activity.

11. The computer readable medium of claim 9, further comprising using the first frequency segment to monitor non-operating channels within an operating range of the wireless communication device after switching.

12. The computer readable medium of claim 9, wherein the instructions when accessed further cause a machine to perform operations including triggering monitoring based on an observation of at least one attribute selected from a group consisting of packet error rates and received beacons above respective predetermined thresholds.

13. The computer readable medium of claim 12, wherein the instructions when accessed further cause a machine to perform operations comprising informing the wireless network of a change in communication bandwidth resulting from the triggering.

14. The computer readable medium of claim 9, wherein the instructions when accessed further cause a machine to perform operations including triggering monitoring at predetermined time intervals.

15. The computer readable medium of claim 9, wherein the instructions when accessed further cause a machine to perform operations comprising informing the wireless network of the switching.

16. The computer readable medium of claim 9, wherein the first frequency segment and the second frequency segment correspond to non-contiguous 80 MHz segments of a non-contiguous 160 MHz channel.

17. An apparatus comprising:
a wireless communications device having a processor, a memory, and a radio, the wireless communication device arranged to:

receiving, by a wireless communication device, an allocation of a channel for communication in a wireless network having a bandwidth comprising a first frequency segment and a second frequency segment; and re-purposing the first frequency segment for monitoring non-operating channels within an operating range of the wireless communication device while continuing to use the second frequency segment for communications by the wireless communication device, wherein the apparatus is arranged to:

continue to use the second frequency segment for communications by the wireless communication device by establishing a Wi-Fi Direct link using a non-DFS (Dynamic Frequency Selection) channel;

re-purpose the first frequency segment for monitoring non-operating channels within an operating range of the wireless communication device by monitoring non-operating channels subject to DFS rules; and switch communication from the second frequency segment to one of the non-operating channels by switching communication from the non-DFS channel to one of the channels subject to DFS rules.

18. The apparatus of claim 17, wherein the apparatus is further arranged to switch communication from the second frequency segment to one of the non-operating channels based on a monitoring of the non-operating channels using the first frequency segment.

19. The apparatus of claim 18, wherein the apparatus is further arranged to use the first frequency segment to monitor non-operating channels within an operating range of the wireless communication device after switching.

20. The apparatus of claim 17, wherein the apparatus is arranged to monitor non-operating channels within an operating range of the wireless communication device by performing at least one operation selected from a group consisting of detecting and monitoring radar, monitoring interference, monitoring noise level, monitoring 802.11 signals, and monitoring channel activity.

21. The apparatus of claim 17, wherein the apparatus is further arranged to trigger monitoring based on an observation of at least one attribute selected from a group consisting of packet error rates and received beacons above respective predetermined thresholds.

22. The apparatus of claim 21, wherein the apparatus is further arranged to inform the wireless network of a change in communication bandwidth resulting from the triggering.

23. The apparatus of claim 17, wherein the apparatus is further arranged to trigger monitoring at predetermined time intervals.

24. The apparatus of claim 18, wherein the apparatus is further arranged to inform the wireless network of the switching.

25. The apparatus of claim 17, wherein the first frequency segment and the second frequency segment correspond to non-contiguous 80 MHz segments of a non-contiguous 160 MHz channel.

* * * * *